March 4, 1958
A. D. WHITE
2,825,618
METHOD AND APPARATUS FOR FABRICATING
GASEOUS DISCHARGE DEVICES
Filed March 24, 1955
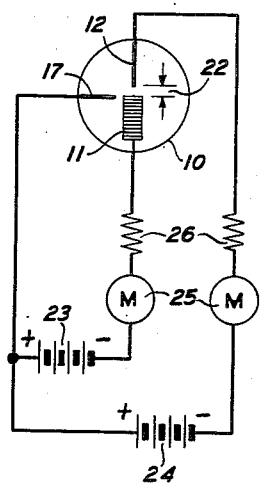
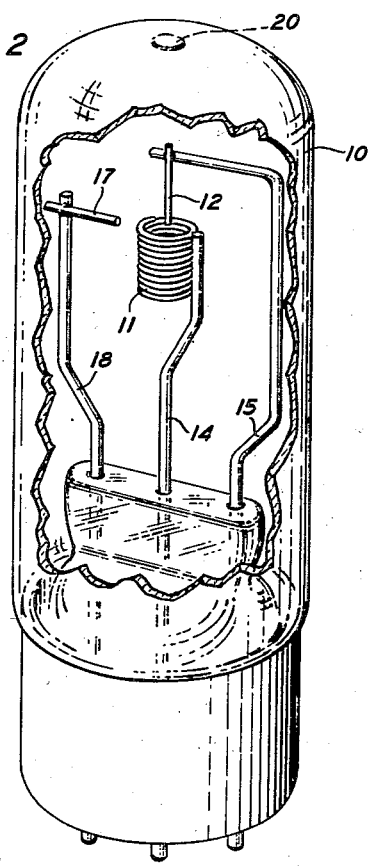
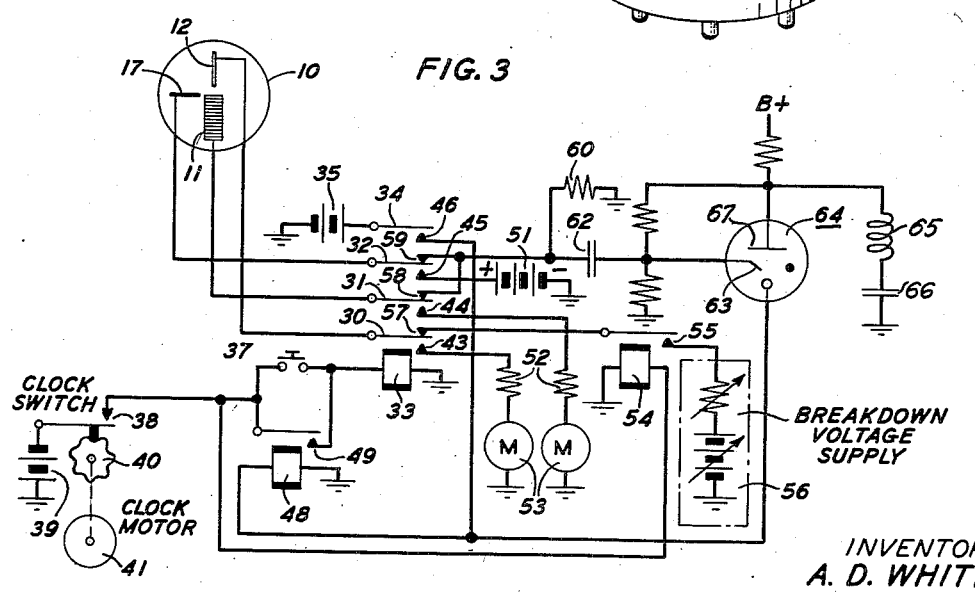
INVENTOR
A. D. WHITE
BY
ATTORNEY United States Patent Office 2,825,618
Patented Mar. 4, 1958

2,825,618

METHOD AND APPARATUS FOR FABRICATING GASEOUS DISCHARGE DEVICES

Alan D. White, Plainfield, N. J., assignor to Bell Telephone Laboratories, Incorporated, New York, N. Y., a corporation of New York Application March 24, 1955, Serial No. 496,391

13 Claims. (Cl. 316—1)

This invention relates to gaseous discharge devices and more particularly to methods and apparatus for fabricating such devices.

When gaseous discharge devices are utilized as switching elements in switching networks, as that described in Bruce-Straube Patent 2,684,405, July 20, 1954, the accurate determination of the breakdown voltage of the device becomes of considerable importance. If a tube is operated at the pd minimum of the Paschen curve, generally referred to as the Paschen minimum, then the breakdown voltage is not greatly varied by changes in distance or pressure. However, when a device is operated at the Paschen minimum the breakdown voltage is also a minimum. This decreases the margin between the breakdown and sustaining voltages, limiting the number of such devices that may be employed in a switching network without erroneous breakdown of a device due to the cumulative sustaining voltages of other devices applied across it.

It is therefore desirable to operate a gaseous discharge device at other than the Paschen minimum in order to increase this margin between the sustain and breakdown voltages. However, it is still very desirable that the breakdown voltage should be a predetermined value which is constant for all the devices in the network. It therefore becomes important that the initial determination of the anode-to-cathode spacing be made exceedingly accurate.

Priorly the anode-to-cathode gap spacing has been determined by various methods, mainly mechanical in nature, relying on the use of accurate and elaborate jigging fixtures or on the skill of trained technicians to make adjustments by eye using various optical arrangements. All of these methods are complicated, require trained personnel to accomplish, and are susceptible to errors in the determination of the final gap spacing. Further, even though the initial spacing be accurately determined by any of these methods, the breakdown voltage may still vary between different devices with the same spacing due to slight variations in the initial filling pressure, which is very difficult to control during the manufacture of large numbers of gaseous discharge devices.

It is a general object of this invention to attain accurate adjustment of the critical anode-to-cathode spacing in a gaseous discharge device.

Further objects of this invention include enabling an accurate anode-to-cathode spacing to be attained without the employment of mechanical jigs or optical measurements, attaining the desired spacing automatically to dispense with the necessity of employing trained personnel to determine the spacing, and determining the spacing after the device has been sealed off.

Thus it is an object of this invention to provide an improved method for accurately determining the anode-to-cathode spacing of a gaseous discharge device.

It is still another object of this invention to provide apparatus for automatically determining and checking the anode-to-cathode spacing in a gaseous discharge device.

It is a further object of this invention to enable the attainment of an accurately predetermined breakdown voltage between the anode and cathode of a gaseous discharge device regardless of variations in the initial filling pressure of the device.

These and other objects of this invention are attained in specific embodiments wherein the gaseous discharge device comprises a hollow cathode and a fine wire anode directed towards the hollow cathode so that the tip of the wire is the active portion of the anode and determines the anode-to-cathode spacing. The proportioning of the cathode, the anode-to-cathode gap, and the gas pressure may advantageously be such, as disclosed in Patent 2,804,565, M. A. Townsend, August 27, 1957, that the device exhibits a stable negative resistance characteristic over the range of currents and frequencies at which it is intended to be employed in the switching network.

An auxiliary aging anode is also positioned in the device. In accordance with one aspect of this invention, the main anode-to-cathode gap spacing is initially chosen smaller than the desired amount and the envelope of the device filled with gas and sealed off. A discharge is then initiated between the aging anode and the cathode; the aging anode is positioned to one side of the main gap so that it can readily see both the cathode and the main anode but its actual positioning is not critical. A fairly large discharge is initiated between this aging anode and the cathode, the hollow cathode structure being a copious source of electrons and positive ions. At the same time, the wire main anode is held at a negative potential with respect to the auxiliary anode; this may be by applying a negative potential directly to the main anode. Because of this potential at the main anode, positive ions issuing from the hollow cathode cause an intense bombardment of the end of the anode facing the cathode with a consequent etching or eroding action of the tip of the wire anode. By periodically interrupting the discharge and measuring the breakdown potential between the main anode and cathode, accurate track can be kept of the spacing between the anode and the cathode as the end of the anode is eroded away.

As mentioned above, for gap spacings larger than the spacing at the minimum in the Paschen curve, the gap breakdown voltage is a function of the spacing. Therefore by interrupting the discharge to the aging anode and measuring the breakdown voltage, the gap spacing may be readily determined. However, it should be noted that the gap spacing itself is only of importance as it determines the breakdown voltage; accordingly in accordance with a feature of this invention it is the final desired critical determination that is directly measured to ascertain when the gap spacing is correct. The initial variations in gas pressure are also compensated for. When the proper breakdown voltage is found, the discharge to the aging anode is not renewed and the eroding process stopped.

In accordance with another aspect of this invention, this process is entirely automatic. In one specific illustrative embodiment, the etching biases and the proper biases for breakdown of the main gap are alternately applied to the device under control of a relay operated by a clock source so that the aging discharge is periodically automatically interrupted to allow the breakdown biases to attempt to break down the main gap. The breakdown potential applied to the main anode at this time is chosen to be just above the desired breakdown voltage. This is done because, in this specific embodiment, the main gap will break down for all gap spacings smaller than that desired and, on breakdown of the main gap, the etching discharge will again be initiated and the anode further ionically etched. Accordingly when the gap spacing is just at the desired breakdown voltage, it is necessary that the main gap not break down so that the periodic etching cycle is interrupted.

Actually because of the change in gas density brought about by the temperature rise at the cathode and the anode during the high current etching process, the breakdown voltage which is measured during the interruption in the etching cycle, and thus within a few milliseconds after the etching is interrupted, is likely to be several volts lower than the breakdown voltage of the tube when it is cold. This is to be expected from the Paschen curve wherein the breakdown voltage is dependent on both the anode-to-cathode gap spacing and also the gas pressure within that gap. However, this difference may be readily recognized and compensated for in determining the breakdown voltage bias to be applied to the main gap to determine when the etching process should be interrupted.

Further, the cathode may be suported by a bimetallic or other thermally sensitive support so adjusted that the change in position of the cathode exactly compensates for the change in density, as further disclosed in application Serial No. 496,431, filed March 24, 1955, of V. L. Holdaway. Such a mounting is particularly advantageous in tubes employed in switching networks wherein the anode-to-cathode gaps are at other than the Paschen minimum. For the reasons discussed above with reference to the desirability of accurately determining the cathode and anode gap and maintaining that gap constant in all devices in the switching network, it is also desirable that changes in gas density in the gap not affect the breakdown voltage of one device relative to the breakdown voltages of the other devices in the switching network. However, if one device has just been utilized in a connection through the network and the gas in its anode-to-cathode gap has not had a chance to cool, even though the spacings between the anodes and cathodes of all the devices have been accurately determined to be the same in accordance with the techniques of this invention, still the pd product for this one device will be lower and the device's breakdown voltage will also be lower. This device will therefore not properly compete in the operation of the network for the connection being set up. In accordance with the teaching of the above-mentioned Holdaway application, the pd product may be kept constant for all devices in the network under all operating conditions by supporting the cathode on a compensating mount arranged so that heating of the cathode causes the cathode to be moved the exact amount required to compensate for the lowering of the gas density in the anode-to-cathode gap, in addition to originally accurately determining the anode-to-cathode gap spacing in accordance with this invention.

It is a feature of this invention that the spacing and thus the breakdown voltage between the anode and cathode in a gaseous discharge device be determined by initating a discharge in the device and bombarding the anode with positive ions to erode and etch away the end portion of the anode.

It is another feature of this invention that an auxiliary aging anode is positioned in a gaseous discharge device and a large discharge initiated between the auxiliary aging anode and the main cathode while the potential of the main anode is maintained negative with respect to the auxiliary anode so that the main anode is bombarded by positive ions from the aging discharge to etch away the end portion of the discharge. Further, in accordance with a feature of this invention, the cathode is advantageously a hollow cathode and thus a copious source of electrons and positive ions for the discharge while the anode is a wire anode with its end or tip facing the hollow of the cathode, the critical spacing being determined by the end or tip of the wire anode and this end or tip being the portion etched or eroded away by the ion bombardment.

It is still another feature of this invention that the aging discharge be periodically interrupted to allow measurement of the anode-to-cathode spacing. Further, it is a feature of this invention that the anode-to-cathode spacing be measured during the interruption of the aging discharge by determination of the breakdown voltage in the main gap.

It is a further feature of this invention that the auxiliary or aging discharge be periodically interrupted and the main gap breakdown measured during these intervals, the aging discharge being not reintiated when the spacing of the main gap has increased to the point that the main gap no longer breaks down on application of the applied breakdown potential.

It is a still further feature of this invention that aging apparatus include circuit means for cyclically applying to the aging anode, main anode, and cathode of the device either appropriate biases to maintain the aging discharge and ionically etch the main anode or appropriate biases to attempt to break down the main gap under a constant breakdown potential across the gap, the circuit being arranged so that the application of the biases to the electrodes for etching of the anode is discontinued on failure of the main gap to breakdown under the constant breakdown potential.

A complete understanding of these and various other features of this invention can be gained from consideration of the following detailed description and the accompanying drawing, in which:

Fig. 1 is a schematic representation of one circuit employable in carrying out the process of this invention;

Fig. 2 is a perspective view of an illustrative gaseous discharge device which may be fabricated in accordance with this invention, a portion of the glass envelope having been broken away to show the internal electrodes more clearly; and Fig. 3 is a schematic representatiion of one illustrative embodiment of aging apparatus in accordance with this invention.

Turning now to the drawing, the gaseous discharge device may advantageously comprise a glass envelope 10 in which are mounted a hollow cathode 11 and a main anode 12. The hollow cathode may advantageously be a closed helical coil, though other types of hollow cathodes may be employed. I have found that the etching process in accordance with this invention may be attained with any cathode which is a copious source of electrons and positive ions. In this specific embodiment the cathode 11 is mounted by a support wire 14, though bimetallic supports or mounts, as further disclosed in application Serial No. 496,431, filed March 24, 1955, of V. L. Holdaway and referred to above, may also advantageously be employed.

The anode 12 is a fine or thin wire supported from a larger wire 15 so that the tip of the wire 12 is directed towards and opposite the hollow cathode 11. Advantageously the wire anode 12 is axially mounted with respect to the cathode 11 so that the etching of the tip of the wire 12, as further described below, will be symmetric.

An auxiliary aging anode 17 is also mounted within the envelope 10, as by a lead wire 18. Anode 17 is advantageously positioned to one side of the main anode-cathode gap and in such relation thereto that it can directly see both the main anode and the cathode. A spot of radium 20 may also advantageously be positioned on the inside of the envelope 10, as is known in the art.

The critical spacing and the spacing that is accurately and automatically determined in accordance with this invention is the anode-to-cathode gap, designated by the reference numeral 22 in Fig. 1. This gap is purposely made too small when the device is assembled, filled with gas at an appropriate pressure, and sealed off. A discharge is then initiated between the aging anode 17 and the cathode 11 by the voltage source 23 connected therebetween. At the same time a negative potential, from the voltage source 24, may advantageously be applied to the main anode. Meters 25 and ballast resistances 26 are included in the connections to both the cathode 11 and the anode 12; the ballast resistances 26 limit the discharge current to the desired values which may be readily ascertained by the meters 25. The correct value of current to be utilized in the anode etching process for any given device configuration will be determined by that configuration, the spacings, the type and shape of the electrodes, and the rapidity with which it is desired that the etching progress. In one specific illustrative embodiment I have found that satisfactory etching of the anode 12 by ionic bombardment can be realized by drawing about 30 milliamperes to the cathode 11 and 20 to 25 milliamperes to the anode 12. In this specific embodiment the gap spacing 22 was increased from 0.015 inch to 0.025 inch in forty minutes by ionic etching in accordance with this invention.

In this one specific illustrative embodiment the anode 12 was of 0.005 inch molybdenum wire and the anode 17 of 0.020 inch molybdenum wire. The anode 12 was located centrally with respect to the opening of cathode 11 and initially 0.015 inch away therefrom; the anode 17 was located so as to be level with the top of the cathode 11 and 0.030 inch away therefrom, though the positioning of the auxiliary anode is not critical.

Turning now to Fig. 3, there is depicted one illustrative embodiment of apparatus, in accordance with this invention, for ionically etching the anode 12 and cyclically interrupting the aging discharge and the ionic etching to measure the breakdown voltage of the main gap and thus the main gap spacing. The cathode 11, main anode 12, and aging anode 17 are each connected to the armatures 30, 31, and 32 of a relay having an actuating coil 33; a fourth armature 34 is connected to a source of positive potential 35. When it is desired to start the etching process, a switch 37 is manually closed, closing a circuit from ground through the coil 33, switch 37, and a clock switch 38 to a source 39 of negative potential. The clock switch is opened and closed in accordance with a predetermined cycle, which in one specific embodiment was closed for 70 seconds and opened for 10 seconds. Clock switch 38 may be controlled by any type of synchronous or clock source; in the specific embodiment depicted in the drawing the openings and closings of the clock switch 38 have been indicated as controlled by a rotating cam 40 under control of a clock or synchronous motor 41.

When the switch 37 is closed during that portion of the clock cycle that the clock switch 38 is closed, relay 33 is actuated transferring each of the armatures 30, 31, 32, and 33 to the lower contacts 43, 44, 45, and 46, respectively. Closure of the armature 34 and contact 46 applies the source 35 to the relay 48, thereby closing contacts 49. An alternate path is now provided between the relay 33 and the source 39 and the switch 37 may be released.

Operation of the relay 33 has also applied appropriate potentials to the aging anode 17, main anode 12, and cathode 11 to initiate the etching discharge between the cathode 11 and the anode 17 and to bombard the anode 12 with ions to cause an etching or eroding of the tip of the anode 12 to increase the spacing of the main gap. Thus the positive terminal of source 51 is connected through contact 45 and armature 32 to the aging anode 17, the negative terminal of source 51 being connected to ground; at the same time cathode 11 is connected through armature 31 and contact 44 to ground through a ballast resistance 52 and a meter 53. Similarly the main anode 12 is connected through the armature 30 and the contact 43 to ground through a ballast resistance 52 and meter 53. While I have found that the anode 12 may advantageously be connected during the ionic bombardment to a source of negative potential, this is not essential provided that the main anode is negative with respect to the auxiliary anode during the etching process so that it will be bombarded by ions. Further, the current drop across the resistor 52 serves to apply a negative bias to the main anode. However, the resistor 52 mainly serves to limit the current flow and thus limit the rapidity of the etching process.

With the relay 33 operated and the various armatures in the positions described above, the etching process continues for the remainder of the closed portion of the clock cycle of clock switch 38 which, in one illustrative embodiment, is for the remainder of the 70 seconds. At the end of this interval the clock switch 38 opens, thereby releasing the relay 33, interrupting the etching discharge in the device, and removing the source 35 from the relay 48. During the open portion of the clock cycle, which in this one illustrative embodiment is 10 seconds, the device is allowed to cool down.

At the end of the open portion of the clock cycle the switch 38 closes again. As neither switch 37 nor contacts 49 are closed, the relay 33 is not activated and the etching process does not recommence. However, current is applied to the winding of a relay 54 closing the contacts 55 and thus applying a positive potential, from the priorly set breakdown voltage source 56, through the contact 57 and armature 30 to the anode 12. At the same time both the cathode 11 and the auxiliary anode 17 are connected to ground through the armatures 31, 32 and contacts 58, 59, respectively, and the ballast resistance 60.

If the tip of the main anode 12 has not been sufficiently etched away, so that the breakdown voltage of the device is still less than that desired, the device will break down when the breakdown voltage is applied from source 56 to the main anode 12. Accordingly current will flow to the cathode 11 and through the resistance 60 to ground, causing a pulse of voltage to pass through a capacitor 62 connected to the resistance 60 and to the starter anode 63 of a gaseous triode 64. This voltage pulse triggers the gaseous triode 64 which fires and current flows in its main gap. This current also flows through the winding 48 causing the contacts 49 to close, thereby again operating the relay 33. As before, operation of relay 33 transfers each of the armatures 30, 31, and 32 from the voltage breakdown measuring circuit to the appropriate biases and connections for further etching of the anode 12. At the same time closure of the contact 46 and armature 34 again applies the source 35 to the relay 48.

The gaseous triode 64 is thus no longer necessary and conduction therein is put out by a relaxation effect due to the inductor 65 and capacitor 66 connected to the anode 67 of the triode 64. The triode is of course advantageously extinguished before the next opening of the clock switch 38.

For the remainder of the closed portion of the clock switch cycle the etching of the anode 12 continues. When the clock switch 38 again opens, the device 10 is again allowed to cool down before applying the breakdown voltage from source 56 through the contacts 55 to the device on the next closure of the clock switch 38. The above cycle of operation continues until the tip of the anode 12 has been ionically etched away sufficiently so that the predetermined breakdown voltage from the source 56 is insufficient to effect a discharge between the anode 12 and cathode 11. When this occurs triode 64 will not conduct and the contacts 49 will remain open, thereby ending the etching process.

It is to be understood that this invention is not dependent on the type of cathode, the electrode configuration, or the gas pressure in the device. While a helically coiled cathode has been depicted in the drawing for purposes of illustration, any other type of cathode capable of sustaining a large discharge may be employed. Various of these other cathodes are also disclosed in the above-mentioned Townsend patent, but this invention is not limited to merely the cathodes disclosed therein.

It is to be emphasized again that while the anode-to-cathode gap is accurately determined in accordance with my invention, it is the breakdown voltage itself that is of paramount interest. Thus when a number of devices, such as that disclosed in Fig. 2, are fabricated and have their gap spacings determined in accordance with my invention, it is possible that the respective gap spacings will not be the same, for the filling pressure of the gas in the various devices may be slightly different. However, these differences are also compensated for as it is the final and important criterion, the breakdown voltage itself, which determines when the gap spacing is proper.

Thus it is to be understood that the above-described arrangements are illustrative of the application of the principles of the invention. Numerous other arrangements may be devised by those skilled in the art without departing from the spirit and scope of the invention.

What is claimed is:

1. In the fabrication of gaseous discharge devices, the method of accurately determining the anode-to-cathode breakdown voltage comprising initiating a first discharge in the device, maintaining the anode at a potential to be bombarded by ions from said first discharge to etch away the end portion of the anode, periodically interrupting said first discharge, attempting to establish a discharge between said anode and cathode while said first discharge is interrupted, and permanently discontinuing said first discharge when said discharge between the anode and cathode cannot be established.

2. Apparatus for accurately determining the spacing between the anode and cathode of a gaseous discharge device having another electrode comprising means for initiating a discharge between said cathode and said other electrode, means for maintaining said anode at a potential to be bombarded by ions from said discharge, means for periodically interrupting said cathode-to-other electrode discharge, means for establishing a discharge between said cathode and anode while said other discharge is interrupted, and means for permanently discontinuing said cathode-to-other electrode discharge when the anode-to-cathode breakdown voltage has attained a desired value.

3. Apparatus for accurately adjusting the spacing between the anode and cathode of a gaseous discharge device comprising means for initiating a first discharge in said device, means for maintaining the anode at a potential sufficient to cause ion bombardment of said anode by said discharge, means for periodically interrupting said discharge, means for attempting to initiate a discharge between said anode and cathode when said first discharge is interrupted, and means for reinitiating said first discharge on occurrence of said discharge between said anode and said cathode.

4. Apparatus for accurately adjusting the breakdown voltage between the anode and cathode of a gaseous discharge device comprising means for alternately applying a first and a second set of potentials to said anode and cathode, said first set of potentials establishing a first discharge in said device and maintaining said anode at a potential such that it is subjected to ion bombardment and said second set of potentials applying a positive potential to said anode and seeking to establish a discharge between said anode and said cathode, and means for interrupting said alternate application of said first and second sets of potentials when said second set of potentials can no longer establish said discharge between said anode and said cathode.

5. Apparatus for accurately determining the spacing between the anode and cathode of a gaseous discharge device having a third electrode comprising means for initiating a first discharge between said cathode and said third electrode, means for applying a potential to said anode such that said anode is subjected to ion bombardment to etch away a portion thereof, means for interrupting said first discharge and allowing said device to cool, means for applying a potential across said anode and cathode to effect a discharge therebetween, and means for extinguishing said last-mentioned discharge and initiating said first discharge again.

6. Apparatus for accurately determining the spacing between the anode and cathode of a gaseous discharge device also having an auxiliary anode comprising means for alternately applying a first set of potentials to said anode, cathode, and auxiliary anode to maintain a discharge between said cathode and said auxiliary anode and bombard said anode with ions from said discharge to etch away an end portion of said anode and a second set of potentials to said anode and cathode to attempt to effect a discharge therebetween, and means for ceasing said alternate application of said first and second sets of potentials when said second set of potentials can no longer establish said discharge between said anode and said cathode.

7. Apparatus for accurately adjusting the anode-to-cathode spacing in a gaseous discharge device having a hollow cathode, a wire anode positioned opposite said cathode and having an end portion facing said cathode and another electrode, comprising a first relay having a plurality of transfer armatures, each of said cathode, anode, and other electrode being connected to one of said armatures, means applying a positive potential to said other electrode to maintain a discharge between said electrode and said cathode and to bombard said anode with ions to etch the end thereof away, said means including a first set of contacts closed to said armatures when said relay is activated, means applying a breakdown potential to said anode to attempt to effect a discharge between said anode and said cathode, said last-mentioned means including a second set of contacts closed to said armature when said relay is not activated, a clock source for activating said relay to transfer said armatures between said first and said second sets of contacts in accordance with a predetermined cycle, and means for connecting said clock source to said relay on occurrence of a discharge between said anode and said cathode.

8. Apparatus in accordance with claim 7 further comprising means for applying said breakdown potential to said anode only during the activating portion of said cycle.

9. Apparatus in accordance with claim 8 wherein said connecting means further comprises a gaseous triode having a starter anode, cathode, and main anode, means applying a voltage to said starter anode on occurrence of said discharge, and relay means activated on flow of current in said triode for connecting said clock source to said first-mentioned relay means.

10. In the fabrication of gaseous discharge devices, the method of accurately determining the anode-to-cathode breakdown voltage of a device comprising initiating a discharge between the cathode and a third electrode in the device, thereby bombarding the anode with positive ions to erode and etch away the end portion thereof, periodically interrupting the discharge between the cathode and the third electrode, and seeking, during the period of interruption, to establish a discharge between the cathode and the anode by applying therebetween a preassigned voltage, whereby the anode-to-cathode breakdown voltage is accurately determined when the preassigned voltage cannot effect a breakdown therebetween.

11. In the fabrication of gaseous discharge devices, the method of accurately determining the anode-to-cathode breakdown voltage comprising initiating a first discharge between the cathode and another electrode in the device, maintaining the anode at a negative potential with respect to said other electrode, thereby bombarding the anode with positive ions to etch away the end portion thereof, periodically interrupting the first discharge, attempting to establish a discharge between the anode and cathode while the first discharge is interrupted, and permanently discontinuing the first discharge when the discharge between the anode and cathode cannot be established.

12. In the fabrication of gaseous discharge devices, the method of accurately determining the anode-to-cathode spacing comprising the steps of initiating a discharge between the cathode and an auxiliary anode, thereby etching away the end portion of the anode, periodically interrupting the discharge between the cathode and auxiliary anode, attempting to establish, with a preassigned voltage, a discharge between the cathode and anode while the cathode-to-auxiliary anode discharge is extinguished, and discontinuing the cathode-to-auxiliary anode discharges when a cathode-to-anode discharge cannot be established.

13. In the fabrication of gaseous discharge devices, the method of determining accurately the anode-to-cathode breakdown voltage of a device having a hollow cathode, a wire anode including an end portion adjacent to and pointed at the hollow of said cathode, and another electrode, comprising the steps of initiating a first discharge between said cathode and said other electrode, maintaining said anode at a potential to cause an intense ion bombardment of the end thereof facing said cathode, periodically interrupting said first discharge, seeking to establish, with a preassigned voltage, a second discharge between said cathode and anode, and permanently discontinuing said first discharge when said second discharge cannot be established.

References Cited in the file of this patent

UNITED STATES PATENTS

| | | |
|---|---|---|
| 2,428,610 | Beggs | Oct. 7, 1947 |
| 2,507,696 | Depp | May 16, 1950 |